United States Patent
Majumdar et al.

(10) Patent No.: US 7,153,381 B2
(45) Date of Patent: Dec. 26, 2006

(54) CURED APPLIQUE OR LABEL WITH PROTECTIVE FILM ON ARCUATE SIDEWALL OR TREAD OF PNEUMATIC TIRE

(75) Inventors: Ramendra Nath Majumdar, Hudson, OH (US); Lewis Timothy Lukich, Akron, OH (US); Marvin Wayne Tipton, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 370 days.

(21) Appl. No.: 10/308,798

(22) Filed: Dec. 3, 2002

(65) Prior Publication Data

Related U.S. Application Data

(63) Continuation-in-part of application No. 09/365,095, filed on Jul. 30, 1999, now abandoned.

(51) Int. Cl.
*B29D 30/72* (2006.01)
*B60C 13/00* (2006.01)
(52) U.S. Cl. ..................... 156/116; 152/525
(58) Field of Classification Search ............... 152/523, 152/524, 525, 510, 450; 156/123, 116
See application file for complete search history.

(56) References Cited

U.S. PATENT DOCUMENTS 5,380,391 A * 1/1995 Mahn, Jr. .................. 156/240
5,824,397 A   10/1998 Koops et al.
5,834,530 A   11/1998 Ramcke et al.
5,993,961 A * 11/1999 Ugolick et al. ............. 428/354
6,093,271 A *  7/2000 Majumdar .................. 156/116
6,221,453 B1*  4/2001 Majumdar ................. 428/40.2
6,224,958 B1*  5/2001 Mahn, Jr. .................. 428/40.1
6,235,363 B1*  5/2001 Bilodeau ................... 428/40.1
6,235,376 B1*  5/2001 Miyazaki et al. ........... 428/203

FOREIGN PATENT DOCUMENTS

EP    0249918       12/1987
EP    1073031    *  1/2001

* cited by examiner

*Primary Examiner*—Geoffrey L. Knable
(74) *Attorney, Agent, or Firm*—Henry C. Young, Jr.; Alfred D. Lobo

(57) ABSTRACT

An applique having a vulcanizable adhesive layer is co-cured on a rubber article by precuring the applique of predominantly pale natural rubber optionally imprinted with a bar code; coating the upper surface of the applique with a protective self-supporting film of polyamide less than 0.050 mm (2 mils) thick, or a non-self-supporting film of polyurethane less than 25.4 μm, 0.0254 mm (1 mil) thick; adhering the applique to the article at a chosen location; curing the article in a curing mold; and, removing a cured article from the mold with the protective film adhering to the surface of the applique, the surface of which is essentially free from visually observable cracks. The hot flow of rubber in the curing mold does not substantially change the location of the applique which is embedded in the article. If the film does not remain adhered to a cured tire and drops into the mold, it is difficult to retrieve and, when a subsequent article is cured in the same mold, results in a scrap tire.

4 Claims, 2 Drawing Sheets

CURED APPLIQUE OR LABEL WITH PROTECTIVE FILM ON ARCUATE SIDEWALL OR TREAD OF PNEUMATIC TIRE

CROSS-REFERENCE TO RELATED APPLICATION

This application is a continuation-in-part of prior application Ser. No. 09/365,095 filed on Jul. 30, 1999 now abandoned.

FIELD

This invention relates to a rubber applique such as a decorative design, identifying label or machine readable bar code on a label ("bar code label"), non-removably incorporated into either the exterior arcuate convex surface of a rubber sidewall of a pneumatic tire with a tread having a road-contacting surface of lugs and valleys, or in the tread's "footprint", which tire is removed from a curing mold with a protective film firmly adhered to the surface of the applique. The applique is substantially laminar and pale in color, the pale color being visually distinct from and in contrast to black, which is the usual color of the tire's sidewall and tread.

BACKGROUND OF THE INVENTION

Sidewalls of tires are routinely marked for a variety of reasons among which are identification of the manufacturer and brand of the tire with a distinctive "logo", optionally printed with a bar code, or a bar code label, each of which is a relatively small laminar piece of rubber having a width, in the radial direction, substantially smaller than the width (radial) of the sidewall, applied to the sidewall just before the tire is cured in a mold in a curing press. Not so routinely marked in such a manner are treads on a cured tire, and when so marked they are typically provided with a plastic or paper bar code label adhesively secured to the tread after the tire is cured, mainly for inventory purposes.

It is essential that the entire applique be clearly visible after the tire is cured. In particular, it is essential that the surface of the printed bar code, whether on a label or on a logo, be protected as if it never was in contact with release agent sprayed on the inner surface of the mold ("tire paint"). A preferred tire paint currently in use is an aqueous paint formulated to provide necessary adhesion and air bleed to minimize trapped air, for "tread-over-sidewall" tire construction. The surface of the twice-cured uncontaminated applique, whether from black tire paint or contaminants from the sidewall's black rubber, is referred to as a "virgin surface" and it may be printable; when printed, the printed matter is thermally stable at a temperature at which the tire is cured. By "thermally stable" is meant that there is essentially no degradation of the substrate which is printed.

To date, numerous attempts have been made to provide a virgin surface on a white or lightly colored applique co-cured with the "green" tire, without the applique cracking or deforming so as to be illegible. In particular, it is essential that (i) a printed legend on the applique be legible over the entire operating life of the tire, and (ii) the applique cannot be removed without destroying it. This is a difficult challenge on a black side-wall which flexes greatly; it is a more difficult challenge on a tread which is formed by plentiful flow of hot rubber forming lugs and valleys in the tread during cure.

Applique (Bar Code Label) on Sidewall:

The most effective method of providing an applique embedded in the sidewall comprises curing a cured rubber bar code label adjacent the bead of the tire, this being a location subjected to minimal expansion during cure. By "embedded" is meant that the surface of the applique is coplanar with the surface of the contiguous rubber. When the applique is a typical label with a bar code of black vertical variably spaced-apart lines of varying thickness, the spaces between the lines being white or pale, the bar code label is positioned with its longitudinal axis substantially parallel to the periphery of the bead to minimize distortion of the bar code due to multiaxial expansion of the sidewall forming an arcuate convex surface during cure. The bar code in a "near-bead location" cannot be read because the vertical lines and spaces are obscured by the periphery of the rim of the wheel on which the tire is mounted. This inability results from the typical bar code label being relatively small, usually a rectangular label no greater than about 2.5 cm wide and 5 cm long, and the flange of the wheel near the rim being about as wide as the bar code.

Applique (Bar Code Label) on Tread:

A bar code label on the tread of a tire allows it to be identified even when the tread carrying the bar code is in the middle of a vertical stack of tires. To this end, at present, a paper or plastic bar code label is adhesively secured on the surface of a lug of the tread anywhere near the center (circumferential), that is, in the footprint of the tire, but only after the tire is cured, so that the label is not embedded in the cured rubber. It is impractical to adhesively secure the label to the surface of a valley between lugs. Though the function of such a paper or plastic bar code is temporary, it must be kept in mind that its sole function is to identify the tire before it is installed. When the tire has been installed, the imminent destruction of the temporary bar code when the tread contacts the road is of no concern. Despite this limited function of the bar code, it often fails to fulfil its function because the adhesively secured bar code label is dislodged when the tire is handled as it is moved from one location to another.

It is now deemed essential that a manufacturer be able to identify its tires even after their tires have been in service for an extended period, preferably over the life of the tire.

To read the bar code on a label in the worn tread, it is critical that the label survive in the groove or valley between worn lugs. To date, there is no method for non-removably co-curing a machine-legible bar code label to embed it in a groove between lugs in a tread. Moreover, since retailers of tires sell tires made by several different manufacturers, it is envisioned that a logo (e.g. a blimp) along with a bar code label will be co-cured in the footprint of the tread of each brand of tires made by competitors in the marketplace so as to make each competitor's tires visually more readily identifiable than by reading the brand name on the sidewall only. A titania-filled white or pale colored logo is easily seen even from a distance.

It is readily apparent that the surface of an essentially fully cured white or pale colored rubber label on a green tread in which the lugs and valleys are yet to be molded, will be easily stained when the label is contorted with hot tread rubber flowing around it in a curing mold. Moreover, unless a rubber bar code label has the appropriate modulus, it is prone to cracking when cured, thus giving an inaccurate reading of the bar code. Staining due to staining ingredients migrating from the cured tread rubber is a particularly serious problem. Typical staining ingredients include aromatic oils, antiozonants such as paraphenylenediamine, carbon black, processing aids, chemicals in a curing package, other oils and coupling agents, which either individually or in combination, one with another, generate compounds which migrate into the applique. Staining sufficient to cause an error of 5% or more when the imprinted code is read is unacceptable; moreover substantially error-free reading, that is, better than 95% accuracy, is required over a period of at least six months after an imprinted bar code label is cured onto a tire. Such staining is exacerbated by an applique which is porous or which develops microscopic cracks. Therefore it is essential that the modulus of the cured pale rubber substantially match the modulus of the rubber article being cured, so as to conform in the mold without cracking. By "substantially match" is meant that the modulus of the applique is closer than ±100% that of the rubber in which it is secured (before curing the tire) or embedded (after curing the tire), preferably closer than ±50% not only after both, applique and green carcass are co-cured, but also before, that is, on the portion of the green carcass on which the applique is to be adhered.

As taught in U.S. Pat. No. 4,625,101 to Hinks et al, the most successfully read bar codes on a tire are those provided by even and uneven surface portions, that is, linear troughs and ridges molded into the surface of the tire, which uneven portions selectively reflect light from a light source in a scanner. Such molded bar codes are referred to as "bumpy" bar codes. By "successfully read" is meant that less than 5% of the bar codes on various tires, irrespective of size, are incorrectly read either before the green tire is cured, or after it is cured; that is, bar code labels on more than 95% of all cured tires with embedded bar code labels are correctly readable by a bar code scanner. This limitation is critical as a manufacturer cannot tolerate a higher misreading of bar codes. Such bumpy bar codes avoid the problems inherent in using a protective Mylar® polyester film, and recovering the film from within the mold when the film becomes dislodged after the tire is cured. A small piece of film, covered with tire paint and dropped in a mold covered with tire paint, is difficult to find; if not found, a tire cured in the mold with the piece of film somewhere on the tire, will be scrap. However, a commercially available scanner to read such bar codes, referred to as "bumpy" bar codes, is too expensive for general use and is difficult to maintain in satisfactory operating condition.

The Multi-Faceted Problem:

To co-cure a cured applique on the arcuate convex surface of a sidewall of a green tire such that the innermost portion of the applique is radially spaced-apart from the bead of the tire, preferably at least 2.5 cm away; and, when the tire is mounted on a wheel, the applique is to be spaced-apart preferably at least 1 cm from the periphery of the rim, so that the applique is essentially permanently embedded in the cured sidewall, that is, the upper surface of the applique is coplanar with the surface of the contiguous rubber, and the applique is non-removable without destroying it; and firmly self-adhesively adhered to the applique's exposed surface is a flexible protective polymeric film; provided, particularly, that a zone near the applique's interior surface, in combination with the vulcanizable adhesive in contact with the black sidewall, is substantially impermeable to staining ingredients migrating from the rubber sidewall, that is, the applique is not stained when the tire is cured. Since the applique is to be thin, less than 1 mm thick, and a bar code imprinted on it is to be successfully read over a period of at least six months, preferably over the life of the tire, a zone within the applique near its lower surface is to function as a barrier against antiozonants and aromatic oils in the carcass. Therefore the applique is to be filled with enough of a pale, preferably white, inert particulate material such as titanium dioxide, to provide a legible bar code and to help minimize staining, but not so much as to interfere with providing a substantial match of moduli.

Since a long period of time may elapse before a tire is cured, and again, also before a cured tire is further processed through warehouses and eventually sold, it is essential that, after the tire is cured, the protective film remain secured to the "virgin" or printed surface of the applique sufficiently well that, if the film is removable, a force of at least 10 Newtons, preferably more than 30 Newtons but less than will tear the film, is required to remove the protective film.

Further, to co-cure a small, substantially fully pre-cured, bar code label which is machine-readable despite the cured label being on a tire which has been expanded in a curing press, without cracking the label and without any visually observable distortion so that incidence of failure to read the bar code is less than 5%, preferably less than 2%, and most preferably less than 1%; and to locate the bar code label in the sidewall, or on a lug and/or in the valley between lugs of the tread.

Still further, to maintain the protective synthetic resinous film, either self-supporting or non-self-supporting, adhering to the applique's surface without an adhesive, and the film uniformly covering the applique so as to be effective against contamination by tire paint which coats the cured applique during curing of the tire, and against ambient contaminants and hazards after the tire is cured; and if the protective film is removable, and it is desired to remove the protective film, then it should be removable integrally, that is, without tearing into pieces. By "non-self-supporting" is meant that the film requires a supporting surface to maintain its integrity.

Addressing the Problem:

An attempt to solve a portion of the foregoing problem is found in European Patent Application 0 249 918 A2, filed in 1986 by Georg Bohm who recognized that "precure provides integrity and definition to the applique while the curing operation allows for complete and total bonding of the applique to the tire." (see Abstract). He states that "the applique bonds or fuses without distortion of the applique to the green tire by cure or vulcanization within the press, . . . " (see pg 3, right hand col, lines 24–26); thereafter he states " . . . the applique may be substantially totally cured prior to the molding and curing operation" (see pg 4, left hand col, lines 37–39) and "Where the applique 14 is partially pre-cured, form stability is such to (sic) accommodate the use of appliques 0.020–0.060 inch thick without perceptible distortion and without compromising adhesion to the tire. Where fully cured, the applique is preferably adhered to the tire by an appropriate adhesive." (see pg 4, left hand col, lines 49–55).

Bohm uses a substrate 12 from which the applique is transferred to the sidewall; he discloses that the substrate is "an annular ring constructed of metal such as aluminum or steel having good heat conductive characteristics. It has also been found that certain plastics or polymeric materials such as fiber reinforced plastics are suitable for the substrate construction . . . of sufficient thickness to provide a degree of rigidity to the annular ring . . . " Though it is clear that the annular ring provides a protective barrier layer against contamination by a tire paint used on the inner surface of the tire mold, he fails to specify the composition of polymeric materials which are to provide the same function and yet be removable after surviving curing of the tire without tearing; nor does he provide any data for the rubber composition of the applique, which composition must expand with the expanding tire as they are co-cured, or resist expansion without itself being dislodged, if the applique is to be distortion-free; nor does he provide data to support the statements about the purported freedom from distortion.

U.S. Pat. No. 5,824,397 to Koops et al teaches a light-colored base layer of co-curable rubber which is laser-inscribable, and "The base layer can have a transparent protective covering, preferably of polyester, polyamide, perfluorinated polymers or polyimide, if the film also passes through the label vulcanization process together with the corresponding rubber part in order to protect against any soiling of the base layer. Depending on the application of the label, subsequent removal of the protective film is possible." (see col 3, lines 11–18). The drawing (FIG. 1) illustrates a protective film of polyester; the illustrative examples 1 and 2 use protective films of polyethylene and poly(ethylene naphthalate) "PEN" respectively, and claim 10 refers to "polyolefins".

To prevent contamination by ingredients in the black sidewall, the '397 base layer is enveloped on three sides by a barrier layer which is chosen from a polyamide or vapor-deposited aluminum coating, or a film of polyvinylidene chloride or silicon oxide. In example 1, the base layer is partially pre-crosslinked (the degree is unspecified) and enveloped in a barrier layer of ethanolic polyamide.

As seen in the data provided below, a protective coating of polyester film, e.g. Mylar, fails in one tire out of five, to remain on the base rubber layer (label) during curing in a mold. This incidence of failure is unacceptable because the dislodged strip of Mylar film must be manually retrieved from the mold before it is used to mold another tire. Retrieving the strip is difficult because, the Mylar film is coated with tire paint and it is difficult to differentiate the coated strip from other thin laminar pieces of dried tire paint in the mold. Failure to retrieve the Mylar strip results in the strip being incorporated into the next tire being molded; such a tire is scrap. It is critical that the protective film remain self-adhered on the label on at least 98% of the tires cured, that is, the film remains adhered because of the adhesive nature of its surface, without the use of an adhesive.

To avoid the problem of a relatively small strip of Mylar film being dislodged from the face of the label during cure, a long strip of film may be wrapped around the peripheral outer surface of the green toroid so that it will remain in place during cure. However, the film tears because expansion, due both to the physical multidirectional stretching of the tire in the mold, as well as the coefficient of thermal expansion of the film do not correspond to, or closely enough match, those of the sidewall and tread of the toroid.

Polyolefin film, e.g. polyethylene, is thermally unstable above 150° C., melts at curing temperature in the range from about 121° C. to 200° C. and becomes opaque when it mixes with release agent, thus fails to guaranty legibility. When directly "stitched" to the sidewall without an adhesive, though with difficulty, polytetrafluoroethylene (PTFE) film fails to remain in place during cure in one out of five tests (20% failure); when the PTFE film does remain in place after curing, it is not readily removable in one piece because it stretches and tears. An aromatic polyimide film, like the PTFE film is difficult to stitch into the sidewall, and even then, fails to remain in place when the tire is cured; when the polyimide film does remain in place, it tears because its coefficient of thermal expansion does not match the expansion of the sidewall. Since applicants have now found that only polyamide film is uniquely effective, it is evident that its inclusion as the only film which is usable among the six polymeric films disclosed in the '397 patent, was fortuitous and not an enabling disclosure. The disclosure is insufficient to allow one skilled in the art to arrive at the choice of polyamide film to the exclusion of the others, without undue experimentation.

Bar code labels coated with protective, transparent, that is substantially light-permeable, non-self-supporting films of well-known compounds such as Dow Corning 20, Releasomer BL-3, and a light-permeable wax, secured to a green tire, then cured conventionally in a curing press, result in the bar code being fully masked and therefore illegible. Such compounds are a logical choice as they are routinely used as release agents.

Though not disclosed as being effective as a substitute for Mylar®, or any other film disclosed as having a desirable protective function, a thin self-supporting polyurethane film less than 50 μm (2 mils, 0.002″) thick, and not derived from an aqueous dispersion or two-component solvent-borne polyurethane (also referred to as "solvent-borne polyurethane lacquers"), is not effective for the purpose at hand. Such self-supporting polyurethane films, mimicking a film of Mylar, fail to adhere to the surface of a tire while it is being cured and falls off into the mold when the cured tire is removed, at least in 5% of all cured tires, which percentage is too high to be acceptable in tire manufacture. Only non-self-supporting water-borne and solvent-borne polyurethanes which provide thin films less than 25.4 μm (1 mil) thick are effective.

Dispersions of polyurethane, whether aqueous or not, found uniquely effective in the invention disclosed herein, have long been used in a variety of coating applications. In particular, U.S. Pat. No. 6,093,271 to Majumdar teaches that a water-borne polyurethane dispersion, "among a variety of clear coating compositions", provides a transparent coating to protect a white or colored sidewall on a cured tire. Majumdar found that a polyurethane film, derived from a water-borne polyurethane dispersion, on a tire exposed to oxidants and ultraviolet (u-v) light protected the colored rubber containing antioxidants and ultraviolet light stabilizers. In addition to the foregoing protection, since the coating was provided on a colored strip after it was cured, and the protected strip in turn was adhesively secured to a cured tire, Majumdar considered suitability of the coating for its abrasion resistance, adhesion and flexibility on the cured sidewall. The body of the colored extrudate being raised relative to the contiguous black rubber, the extrudate was subject to abrasion. Since he chose not to coat the extrudate before it was cured, there was no reason for him to consider the coating's thermal stability under conditions of a curing mold; and there was no reason for him to consider whether the coating was capable of repelling the black tire paint used in the mold in which the tire was cured.

Taking a cue from the teaching in the foregoing '271 patent, of the use of a water-borne polyurethane dispersion on the surface of a cured tire, WO 20 01194453 assigned to Michelin teaches use of an aqueous dispersion of polyurethane to coat the sidewall of a vulcanized tire to protect it against ozone, presumably maintaining a shiny sidewall.

U.S. Pat. No. 5,834,530 to Ramcke et al teaches a bar code printed on the surface of a label which is pre-crosslinked directly below the surface, over the entire area of the label and to a depth extending to as much as 80% of the thickness of the label. As is evident from the data below, when a white rubber label imprinted with a bar code and protected by Mylar film, is uncured over 20% of its depth, the remaining 80% being substantially fully cured, and the label cured under conditions of a curing press, uncured rubber runs out and smears the bar code, making it unreadable, one out of five times. As this incidence of failure is unacceptable, the teachings of the '530 patent do not suggest how to rectify the failure. Partial pre-crosslinking of the label is insufficient to provide a vulcanized label on which a bar code remains a "sharp, high-contrast inscription" as stated (see col 6, lines 56–57), the definition of which is not provided.

All carcasses of pneumatic green tires are built as a series of layers of flexible high modulus cords encased in a low modulus rubber; the cords in each layer are oriented in a chosen path or direction and substantially equispaced and parallel. The tire is cured in a curing press using a curing bladder which forces expansion of the tires. When the carcass is cured, it expands, forcing the carcass against the indentations in the curing mold to form the tread, and all components are co-cured so as to provide a substantially cohesive bond between one and another.

Expansion upon curing of a radial ply tire is small, in the range from about 5% to 20% greater than the size of the green carcass; but expansion of a bias ply tire may range from 30% to 100% or more. The expansion of the sidewall during the formation of its arcuate convex geometry is in the range from 5% to 20% depending upon the structure of the tire. The cured applique is required to be sufficiently biaxially extensible and flexible so that it conforms to the arcuate surface of an expanded sidewall, or the crenelated surface of a tread, without being loosened or dislodged during cure and during operation of the tire.

A release agent normally coats the entire inner surface of the curing mold. In this invention, the applique is provided with a self-adherent, protective film of thermally stable, thermally expansible, synthetic resinous compound which protects the printed and/or colored surface of the applique under the film. In the specific instance where the virgin surface includes a bar code, it can be read through the protective film.

European publication No. 1073031 to Majumdar et al discloses a sidewall to which is non-removably co-cured a bar code label, protected by a film. The film may be removed after the tire is cured, or left in place. The film is stated to "be a thermoplastic, e.g. polyester, thermoset or other material. Desirably the film has a high modulus at 5% elongation such as of at least 2 or 5 MPa." There is no clear identification as to which film of what polymer might effectively discharge its function under conditions of vulcanization; nor is there any indication that the film remains adhered to the surface of the bar code label after the tire is removed from the curing press.

SUMMARY OF THE INVENTION

A cured pale rubber applique, from about 0.1 mm to 1 mm thick, containing sufficient pale-colored particulate pigment such as titanium dioxide or other inorganic compounds to minimize staining of the applique by contaminants from the rubber or a vulcanizable adhesive securing the applique to black rubber, remains flexible enough, and allows itself to be non-removably embedded in a cured black rubber article, in particular a pneumatic tire, and vulcanized into either the sidewall, or, the tread. When the applique is secured to the green tire, its virgin upper surface is vertically spaced apart from the immediately surrounding rubber; the virgin surface is protected by a flexible synthetic resinous polymeric film which may be a self-supporting polyamide film from about 10 µm to less than 50 µm (2 mils, 0.002") thick, or a non-self-supporting polyurethane film from about 5 µm to less than 25.4 µm, 0.0254 mm (1 mil, 0.001"); the protective film remains adhered to the surface of the applique even after the cured tire is removed from the mold in more than 95% of all tires; both the cured applique and the protective film are thermally stable; the applique is also dynamically stable so that when a bar code is provided in the virgin surface, the bar code may be successfully read through the protective film which has been heated to curing temperature, typically about 150° C. By "dynamically stable" is meant that the cured applique expands less than about 10% during curing of the tire.

A laminar decorative design or identifying label of pale rubber filled with from 5% to 20% of a pale-colored particulate pigment, is coated with a non-self-supporting pore-free substantially light-permeable film less than 0.0254 mm (0.001" or 1 mil) thick, preferably in the range from about 1 µm to 10 µm thick, derived from an aqueous dispersion of crosslinkable urethane, or two-component solvent-borne polyurethane. By "pore-free" is meant that the film has no pores large enough to allow tire paint to permeate the film. The lower surface of the label is calendered to a layer of vulcanizable adhesive having about the same thickness about 0.1 mm to 1 mm as the applique, preferably from about 200 µm (8 mils) to 500 µm (20 mils) thick, which may be coated with a cement or solvent-containing layer from about 5 µm to 25 µm thick, and secured to the sidewall of a green tire, the label symmetrically disposed about an expandable portion of the tire, expandable at least 5%, such as the circumferential centerline of the sidewall, or the tread. The tire is then placed in a curing mold, covered with tire paint and cured at about 150° C., and because both the label and its protective film are unconfined except by the interior surface of the mold, each is free to move with the hot flow of sidewall or tread rubber as directed by the forces in the hot curing mold. Upon the tire being removed from the mold, the film remains non-removably adhered to the surface of the label which, despite being expanded at least 5%, is essentially distortion-free, and free of lines due to cracking of its surface. By "distortion-free" is meant that the bar code is successfully read by a commercially available scanner.

A bar code label from about 0.20 mm (0.008" or 8 mils) to 0.50 mm (0.02" or 20 mils) thick is formed from a "white rubber" composition filled with from 5% to 20% titanium dioxide pigment. Upon being essentially fully cured the bar code label has a 300% modulus of less than 3 MPa, preferably less than 1 MPa (at 300% elongation). It is matched to a cured sidewall compound having a 300% modulus of less than 5 MPa, preferably less than 3 MPa. The bar code label is coated with a non-self-supporting film described above, and adhered with a vulcanizable contact adhesive to the sidewall. When adhered, the bar code label is typically symmetrically disposed longitudinally about the sidewall's circumferential centerline. The sidewall is then covered with tire paint and cured in a mold at about 150° C. Upon the tire being removed from the mold, the film remains non-removably adhered to the surface of the bar code label. The code was "successfully read". Thicker labels tend to crack, resulting in errors when reading the bar code.

The bar code label, coated with the non-self-supporting film described immediately above, is stitched into the a green tread, symmetrically disposed transversely about the tread's circumferential centerline, preferably at right angle thereto. The tread and tire are covered with tire paint and cured in a mold at about 175° C. Upon the tire being removed from the mold, the film remains non-removably adhered to the surface of the bar code label; and the code was "successfully read".

When a logo and/or bar code label is protected with a self-supporting film of nylon, such as 6,6-nylon or 6-nylon, when the tire is cured, it requires a force of at least 10 Newtons to remove the film; depending upon whether the cured label is to be co-cured in the sidewall or the tread, the cured label has a matching modulus, typically lower than 2 MPa at 300% elongation; when co-cured in the sidewall the label is spaced apart at least 2.5 cm from the inner periphery of the bead of the tire, and preferably symmetrically embedded longitudinally about the sidewall's circumferential centerline, so that its printed surface is coplanar with the adjacent sidewall surface and the bar code may be read accurately on more than 95% of tires; when co-cured in the tread the cured label is placed in a groove between lugs. The 300% modulus is given because a measurement at 100% elongation or less is insufficiently informative even if measured with reasonable accuracy.

The method of co-curing an applique on a green rubber article comprises, preparing a laminar applique less than 20 mils thick of predominantly natural rubber containing from 15% to 70% of pale inorganic pigment such as titanium dioxide, calcium carbonate and zinc oxide, optionally imprinted with a bar code; curing the applique so as to crosslink to at least an 80% level as determined by a Mooney cure meter; coating the upper surface of the applique with a protective self-supporting film of a polyamide less than 2 mil thick, or a non-self-supporting film of polyurethane less than 25.4 µm, 0.0254 mm (1 mil) thick; applying a vulcanizable adhesive to the lower surface of the applique; adhesively securing the applique to the article at a chosen location on an expandable surface of the green article; curing the article in a curing mold; and, removing a cured article from the mold with the protective film adhering to the surface of the applique free from visually observable surface cracks. Preferably the article is a pneumatic tire, and the location is chosen from "in the sidewall, spaced-apart from the bead of the tire", and from "in the tread's footprint".

BRIEF DESCRIPTION OF THE DRAWING

The foregoing and additional objects and advantages of the invention will best be understood by reference to the following detailed description, accompanied with schematic illustrations of preferred embodiments of the invention as well as an embodiment in which protection of the applique is unsatisfactory, in which illustrations like reference numerals refer to like elements, and in which.

DETAILED DESCRIPTION OF PREFERRED EMBODIMENTS

Figure 1:
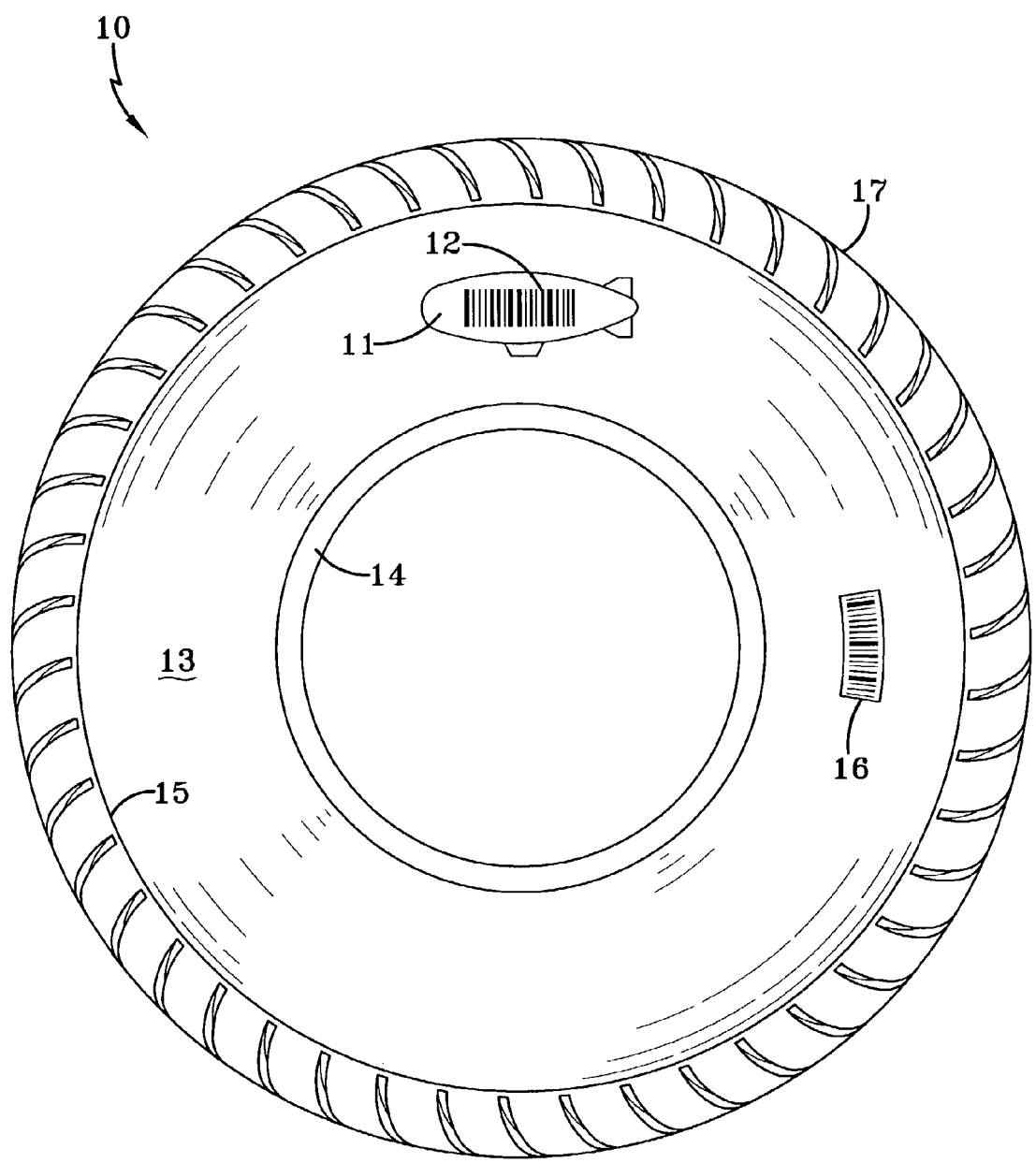
FIG. 1 is a schematic illustration in an elevation view, not to scale, of a cured tire carcass with a logo of a blimp with a bar code imprinted on it, embedded in the sidewall; also embedded is an applique of the manufacturer's identity; a protective film overlying the applique is transparent and invisible in the drawing.

Before an applique, filled with titanium dioxide pigment to provide maximum contrast with the black rubber of the tire, is secured to the tire it is essentially fully cured, that is, at least 80% crosslinked throughout, as determined by a Mooney cure meter. The applique containing up to 50% titanium dioxide pigment is formed from predominantly natural rubber (cis-polyisoprene), preferably more than 75% natural rubber, to ensure that upon curing it has a modulus substantially matched to that of the rubber in which it is embedded, so that it is biaxially extensible at least 10% in each direction. Such extensibility fails to interfere with the accuracy of the reading of the bar code. If a bar code label, it is imprinted with a bar code before the label is cured.

The upper surface of the label is coated with a light-permeable polyamide film having an area greater than the label, self-adhered to the label's surface. The lower surface of the label is coated with a vulcanizable rubber-based adhesive with a curing agent, e.g. a cementless adhesive disclosed in U.S. Pat. No. 5,503,940 and the adhesive (referred to as "black adhesive"), when cured, has a modulus which is substantially matched to that of the rubber to which the label is adhered. After curing, the self-supporting film remains adhered to the label's surface which is coplanar with that of the sidewall, or that portion of tread immediately adjacent the label's edges.

Alternatively, the upper surface of the label is coated with a polyurethane non-self-supporting film derived from either a two-component solvent-borne polyurethane, or, from an aqueous dispersion which is typically a one-component, fully-reacted, predominantly linear polymer modified with hydrophilic groups, which latter dispersion is preferred for environmentally sensitive users. The polyurethane film may also be derived from aqueous blocked polyisocyanates and crosslinking agents. U.S. Pat. Nos. 5,017,673; 5,194,487; 5,227,422; 5,331,039; and 5,369,152 describe water-borne polyurethane dispersions some of which are commercially available from a variety of suppliers. Such polyurethane dispersions include the reaction product of polyisocyanates, typically aliphatic polyisocyanates, and polyether or polyester polyols. Dispersing agents are added as separate components or may be reacted with the polyurethane. Ionic groups (e.g., anionic and cationic), or, nonionic groups e.g. poly(ethylene oxide) may be attached to the polyurethane to make it dispersible in water. A variety of additives including adhesion promoters may also be added to the urethane dispersion. The polyurethane particles coalesce into a film upon drying.

The water and solvent resistance of the film may be enhanced by crosslinking, e.g. with a carbodiimide, or, an alkoxylated melamine formaldehyde resin. Ucarlnk® XL-29SE available from Union Carbide, Danbury Conn. is a multifunctional carbodiimide crosslinker. Sancure® 89 is a modified melamine crosslinker available from the Noveon Inc., Brecksville, Ohio. Carboxylic acid functionality present in many anionic modified polyurethanes may be crosslinked with a polyfunctional aziridine. As the wet coating is heated to elevated temperatures, crosslinking occurs through the reaction of the methoxylated melamine resin with the urea or urethane groups in the polymer.

Higher molecular weight polymers with higher crosslink density are obtained from a two-component solvent-borne polyurethane system but the water and solvent resistance of the film are relatively poor compared to those for a film derived from an aqueous dispersion. After curing, the non-self-supporting film remains adhered to the label's surface and is light-permeable. Whether the polyurethane is derived from a waterborne or two-component system, the lower surface of the coated label is coated with a vulcanizable rubber-based adhesive with a curing agent commonly used for tread-splicing and retreading tires before the label is secured to the tire. The vulcanizable adhesive, typically predominantly polyisoprene, is essentially free of an anitozonant and an aromatic oil but typically contains a reinforcing agent such as carbon black, so that the cured adhesive layer functions as an additional barrier (in conjunction with titanium dioxide in the applique) to staining ingredients from within the tire's carcass.

The rubber of the applique is both thermally and dimensionally stable under curing conditions; the polymeric film is thermally stable under curing conditions, but expands as required after the tire is placed in the curing mold.

Construction of Green Tire Carcass with Applique Protected by Non-Self-Supporting Film:

Applique of "blimp" Logo Imprinted with Bar Code, Another with Identifying Label:

Referring to FIG. 1 there is schematically illustrated a conventional toroidal green tire carcass, referred to generally by reference numeral 10, having an applique 11 establishing the manufacturer's identity, the applique simultaneously functioning as a bar code label imprinted with a bar code 12. The applique 11 is stitched into the sidewall 13, and protected by a transparent film not visible in the drawing. The innermost portion of the applique, nearest bead 14 of the tire, is about 2.5 cm from the inner periphery of the bead, and the outermost portion extends into the shoulder 15 of the carcass 10. The applique 11 is located about midway between the bead and the shoulder of the tire. A separate bar code label 16 may also be provided at another location midway between the bead and the shoulder of the tire. The virgin upper surface of the applique is vertically spaced apart from that of contiguous rubber of the tire by the thickness of the applique and the vulcanizable adhesive on the applique's lower surface. When the tire is cured, the applique is embedded in the location chosen. Labels on the tread 17 are not shown in this FIG. 1.

Figure 2:
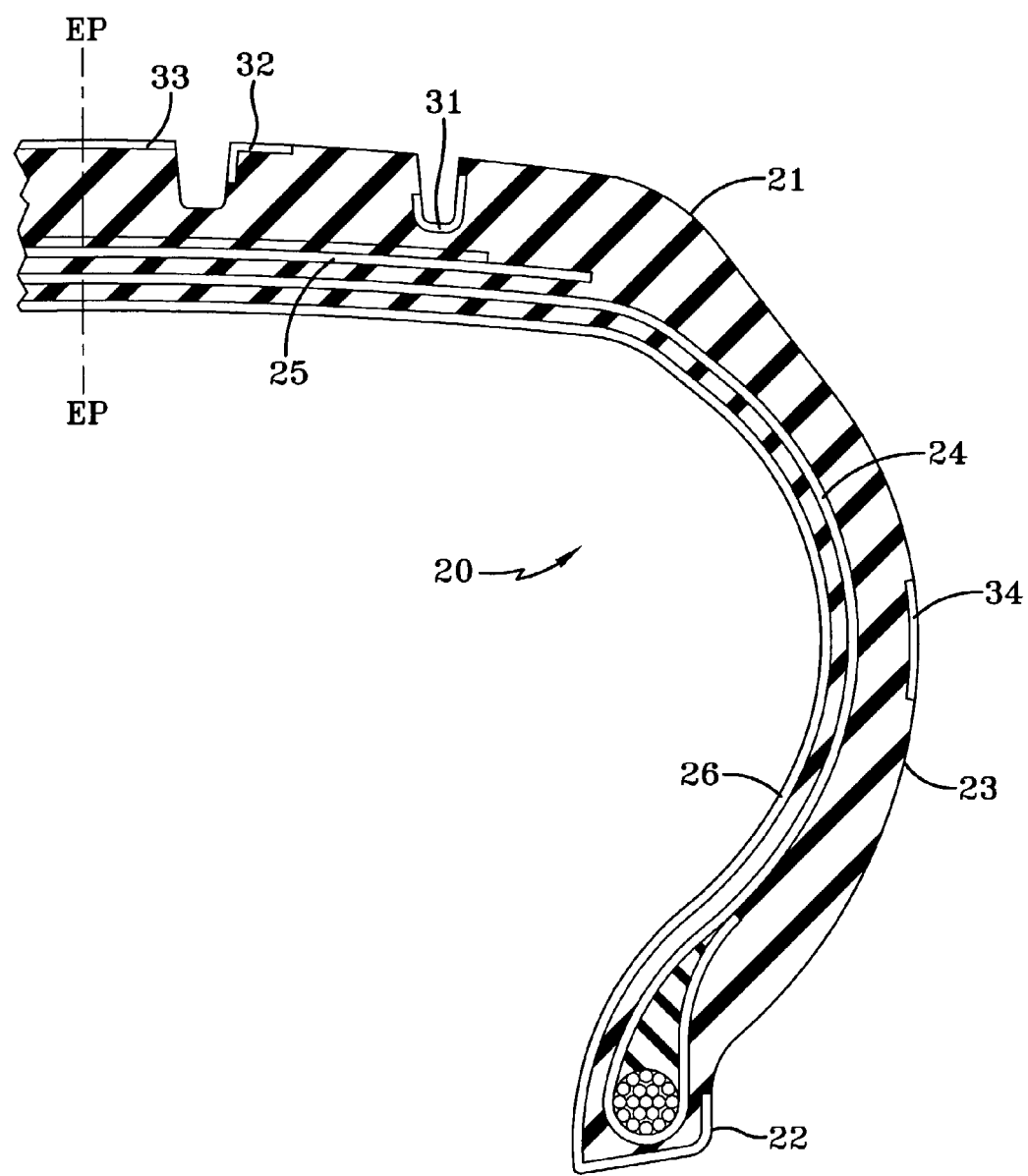
FIG. 2 is a partial cross-sectional elevation, not to scale, of a cured radial tire showing bar code labels embedded in the tread at various locations, and in the sidewall, all labels with a protective film (invisible in the drawing) overlying the labels.

Referring to FIG. 2, there is schematically shown a partial cross-section of a conventional cured toroidal rigid breaker, radial ply tire carcass, referred to generally by reference numeral 20, comprising a circumferential tread 21, spaced beads 22, 22' (not shown) and connecting sidewall portions 23, 23' (not shown) extending between the tread and beads, to form a conventional radial tire. The carcass 20 includes a casing 24 in which the cords or filaments are disposed in a substantially radial direction giving a 90° bias or crown angle in relation to the axis of rotation of the tire. A breaker or belt of several plies 25 of cords are fitted on top of the casing, under the tread, and laid at various crown angles, two of the layers having a low crown angle of the order of 20°. The inner surface of the casing is lined with a rubber inner liner 26 which is substantially gas-impermeable. The components of the tire are assembled on a tire-building drum, the inner liner being the first component positioned on the drum. Before the tire is removed from the building drum, one or more generally rectangular bar code labels 31, 32, 33 are stitched into the tread at various orientations relative to the longitudinal y-axis, which is at right angle to the axis of rotation (x-axis) of the tire; one bar code label 34 is stitched into the sidewall. As shown in the drawing, preferably the labels 31–33 are embedded generally perpendicular to the x-axis, while label 34 is parallel to it. After the tire is molded, a major portion of at least one of the bar code labels, preferably all of it, will lie in a valley between lugs of the tread, as does label 31, to be readable even when the lugs are essentially worn out. Such placement, so that the label is substantially symmetrically disposed about the circumferential centerline of the valley to be formed when a substantially laminar strip of green tread is cured, is achieved by back-locating the location of the label in the strip of green tread after its opposed ends are smoothly spliced together on a tire-building drum; marking the centerline with a light beam; coating the lower surface of the label with a vulcanizable adhesive; adhesively securing the label symmetrically about the centerline, and, removing the green tire after its construction is completed. For easiest reading of the bar code the label is secured with its longitudinal axis either at right angles to the rotational axis of the tire; or, with its longitudinal axis parallel to the rotational axis of the tire.

As illustrated, label 32 is embedded partially in a valley and may be read even after the lugs are partially worn down. Label 33 is on the surface of a lug and legibility of the code will not survive operation of the tire. Label 34 being in the central zone of the sidewall will be legible as long as the portion of the sidewall on which it is secured, is not destroyed. All embedded bar code labels may be read with a standard hand-held bar code scanner such as a Power-Scan® RF Bar Code Scanner available from PSC, Inc., Eugene, Oreg. 97402.

Prior to the bar code labels 31–34 being stitched into the sidewall, they are sprayed with a waterborne polyurethane commercially available as Sancure 776, optionally further crosslinked, and dried to form a film having a thickness in the range from greater than about 2 μm to less than 25.4 μm, 0.0254 mm (1 mil).

Self-Supporting Protective Film:

Labels made from 100% cis-polyisoprene and filled with 10% titanium dioxide, then essentially fully cured, were protected with the following polyester films and tested.
(1) Titanium dioxide-filled polyester film 25.4 μm, 0.0254 mm (1 mil) thick, with one side treated for better adhesion to rubber.
(2) "White" polyester film, 0.0254 mm (1 mil) thick, with photo-printable coating on one side, the other side treated to accept a curable adhesive.
(3) Light-permeable polyester film, 0.0254 mm (1 mil) thick, with thermal-printable coating on one side, the other side treated to accept a curable adhesive.
(4) 6,6-nylon film 19 μm (0.75 mil thick) and light-permeable.

Five samples of each of the foregoing labels are coated with a vulcanizable adhesive and adhered to a tire sidewall compound (identify generically) which is cured at 150° C. for 15 min.

Results with Labels (1) (2) and (3):

In five tests of each sample, one or more of the strips fails to remain on the label when the cure is completed.

Results with Labels (4):

In five tests, all five labels have the film remaining on them when the cure is completed.

Non-Self-Supporting Protective Film:

A 30% titanium dioxide-filled 100% cis-polyisoprene label is coated with the following:
(5) several waterborne dispersions of polyurethane obtained from various sources are each sprayed on the printed bar code on each label and dried; the spraying and drying is repeated until a light-permeable film about 19 μm (0.75 mil thick) is obtained; the bar code label is then adhesively secured to the sidewall with the same vulcanizable adhesive used for labels (1)–(4), then covered with "outside tire paint E-366" obtained from Wacker Silicones Corp., and cured in a mold at about 150° C.

Among the waterborne polyurethane dispersions used are Sancure® 776, Sancure® 2715 and Bayhydur® 302 from Bayer Coatings and Colorants Division, which dispersions may be further crosslinked with Sancure® 89 or Ucarlnk® XL-29SE. Numerous other effective Sancure® waterborne polyurethane systems, e.g. 843, 861, 898, 891, are available. All films remained on the labels the surfaces of which were uncontaminated and visually essentially identical to their condition prior to being cured; the films could be manually removed using a force no greater than about 30 Newtons.

(6) in a manner analogous to that described in (5) above, a two-component solvent-borne polyurethane system obtained from Bayer Corporation is sprayed and dried on several labels which are then adhered to sidewalls of green tires, covered with tire paint and cured. All films remained on the labels, and could not be removed.

The bar code labels (4–6) were readily legible by a commercially available bar code scanner such as the Powerscan, a HHP 3800 LR-12 or HHP 3870 LX-A2 with 100% accuracy both before the green tires were cured, and after they were cured.

Durability of Legible Bar Code:

Samples of the bar codes (4–6) on 6.00-6-1QP046 tires were run and dynamometer tested with variable loads for 30 cycles. All bar codes remained free from cracks and legible. Further, the bar codes on the labels were legible even after fifteen (15) simulated retreading cycles.

Mechanical Properties of Materials for Appliques and Protective Films:

| Material | 50% mod (MPa) | 300% mod (MPa) | Tensile (MPa) | Elong.* % |
|---|---|---|---|---|
| Mylar® film | 176.7 | | 246.9 | 61.6 |
| Applique, green | 1.59 | 2.44 | 2.52 | 320 |
| Applique, cured | 1.28 | 1.87 | 4.75 | 940 |
| Adhesive on ap'ue | 1.42 | 2.97 | 12.70 | 1287 |
| Cured adhesive on ap'ue | 0.86 | 2.24 | 12.82 | 1193 |
| Black sidewall, green | 0.20 | 0.17 | 0.18 | 1680 |
| Black sidewall, cured | 0.94 | 2.57 | 14.03 | 990 |

*elongation at break

What is claimed is:

1. A method for co-curing a cured laminar coded label, legible over the entire operating life of the tire, the label to be secured in a chosen location on a green rubber tire's exterior surface prior to being cured in contact with a release agent on inner surface of a curing mold, the method comprising, applying a vulcanizable solventless adhesive including carbon black and essentially free of an antiozonant and an aromatic oil to the lower surface of the cured laminar coded label of predominantly natural rubber, less than 20 mils thick, containing from 15% to 50% of titanium dioxide pigment, and crosslinked to a level of at least 80% as determined by a Mooney cure meter, the coded label having imprinted on its virgin upper surface a bar code, the adhesive in combination with a zone of pigment and predominantly natural rubber near the coded label's lower surface adjacent the solventless adhesive, being substantially impermeable to staining ingredients migrating from the rubber sidewall and tread so as to correctly read the bar code with a scanner in more than 95 out of 100 tires cured;

coating the upper surface of the coded label with a protective non-self-supporting film of water-borne polyurethane less than 25.4 μm, 0.0254 mm (1 mil) thick providing protection against staining by the release agent;

adhesively securing the cured coded label in the chosen location of the exterior surface; expanding the tire at least 5% and curing it in the curing mold; and, removing a cured tire from the mold with the protective film adhering to the surface of the coded label which is embedded therein without substantially changing its location, the surface of the coded label being coplanar with the surface of the contiguous rubber, the coded label being essentially free from distortion and surface cracks.

2. The method of claim 1 wherein the chosen location is chosen from "in the sidewall, spaced-apart from the bead of the tire", and from "in the tread's footprint".

3. The method of claim 1 wherein the coded label is a rubber having a modulus lower than 5 MPa at 300% elongation.

4. The method of claim 2 wherein the chosen location is "in the tread's footprint" and embedded in a groove between lugs.

* * * * *